UNITED STATES PATENT OFFICE.

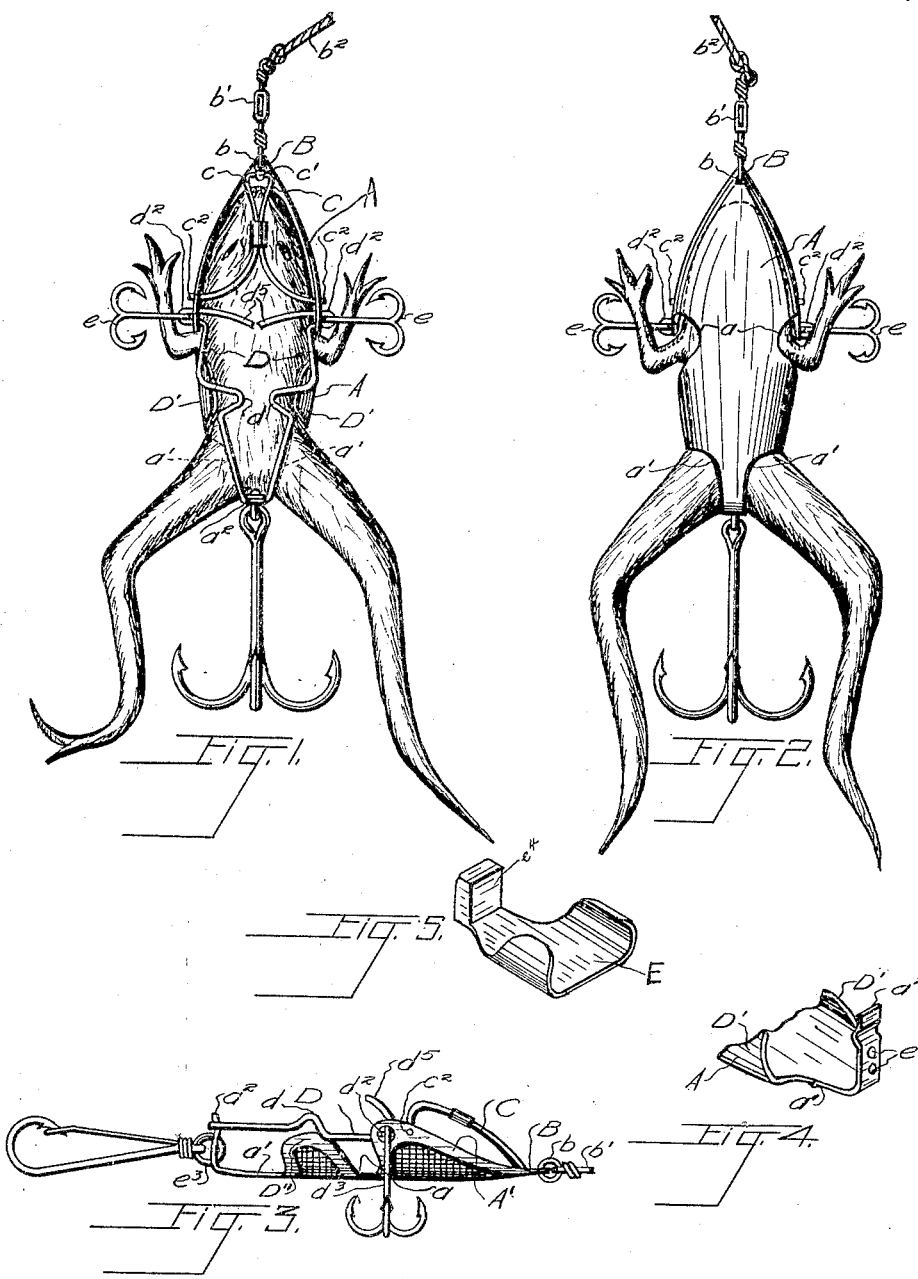

GUNNAR LARSON, OF CHICAGO, ILLINOIS.

LIVE-BAIT HOLDER.

1,326,352.  Specification of Letters Patent.  Patented Dec. 30, 1919.

Application filed July 21, 1919. Serial No. 312,197.

*To all whom it may concern:*

Be it known that I, GUNNAR LARSON, a citizen of the United States, residing at Chicago, Illinois, have invented certain new and useful Improvements in Live-Bait Holders, of which the following, taken in connection with the drawings, is a specification.

My invention has for its object the production of a device designed to be used by fishermen in fishing with live bait, such as frogs, the principal object of the same being to provide a construction which will retain the frog on the hook without mutilating it as has heretofore been the case when live bait is used, and which has meant in a comparatively short time that the bait is dead, which is not particularly attractive to the fish.

A further object of the invention is to provide such a holder whereby the frog's legs are left free as shown in the drawings to move in a natural way, the body of the frog resting on a holder which supports him at the same time holds him securely in place with no opportunity for his release in the water.

A further object of the invention is to provide a device of this kind to which may be attached any kind of fishing hooks now in the market, single, double, or triple hooks of the kind now well known and which may be attached in places provided for them at the sides and the rear of the holder.

A further object of my invention is to provide a live bait holder which is constructed largely of wire bent to form a jacket or housing for the frog which will leave not only the legs of the frog free, but a large portion of the body thereof exposed to view so that as the body is in the water it is difficult to see that the frog is not entirely detached from any fastenings.

With these and other objects in view I have illustrated what I now consider the preferred form of my invention in which:

Figure 1 is a top plan view of my bait holder with the bait arranged therein:

Fig. 2 is a bottom plan view of the same:

Fig. 3 is a side view of a slightly modified form of construction, and

Fig. 4 is an enlarged detail perspective view of the rear end of the fastening device, and Fig. 5 is a perspective view of a removable lining for the bait holder.

Referring to the drawings A represents the base or bottom of the holder which may be formed of aluminum, wire gauze, or of any other material suitable for the purpose, which is designed to hold the body of the bait, which I have here illustrated as a frog, but as is obvious other kinds of bait may be substituted for frogs if desired.

This base A is practically oval shaped in its general contour, with the sides $D'$ thereof bent upwardly to make it slightly dished. Each of the sides of this base A is provided with cut away notches or recesses $a$, $a'$ to provide places for the legs of the frog to protrude unhampered, the whole forming a housing or jacket for the body of the bait.

At the forward or nose end of the base A is an opening $b$ and through this opening is attached a swivel $b'$ to which is attached the line $b^2$.

A frame C preferably formed of bent wire is attached to the forward end of the base A and forms a retaining member extending over the head of the bait as shown more clearly in Fig. 1. This wire is preferably bent in the form of a loop $c$ which is held in place by the lug $c'$ punched out of the base A to form the opening $b$. This lug is bent over the wire loop and retains it in place, the outer ends of this wire frame $c^2$, extending through apertures formed in the sides of the base member A.

A rear retaining frame member D is also formed by bending a single piece of wire in such form that it projects rearwardly to meet the upwardly bent portion $a^2$ of the base member A with which it is detachably engaged. The center of this frame member D which engages the upwardly bent member $a^2$ is bent practically in the form of a loop which spreads outwardly upon each side and is then curved inwardly to provide a frame work over the back of the bait $d$. The wire is then spread on each side across the body of the bait and is bent into two small loops $d^2$, which loops project loosely through corresponding openings $d^3$, in the sides of the base member A and the ends of the frame are bent toward each other and meet practically above the center of the bail, at $d^5$.

Removably attached through each of the loops $d^2$ are cluster hooks $e$, at the sides of the bait. By bending the wire D inwardly the shank of the hook is extended through the opening $d^3$, and the ends of the wire $d^5$ passed through the loop at the end of the shank: the wire is then allowed to spring outwardly when the loops $d^2$ will be extended through the openings $d^3$, and the hooks $e$, hang loosely upon each side of the base A.

Through the upstanding member $a^2$ I provide the holes $e^2$ through which is passed a small ring $e^3$ which engages a single hook or a cluster of hooks as desired by the fisherman.

It will thus be seen that I have provided a live bait holder which is capable of retaining the bait in place without mutilating or injuring it, and while it is being used it assumes an easy natural position which is desirable also as a better decoy: the frame work or cage holding the bait is large enough to hold the bait firmly in place leaving the greater portion of the body of the bait exposed: one which is quickly and easily manipulated when changing or replacing the bait, and one which will permit the use of any kind of hooks or other paraphernalia desired.

In Fig. 5 I have illustrated an insert or lining member E which is adapted to seat inside of the shell or casing A when a small sized frog is being used. The shape of this insert conforms to the shape of the rear end of the shell and has an upstanding portion $e^4$ which abuts against the upstanding member $a^2$ whereby the distance from the front to the rear of the shell A is shortened thereby preventing the small frog from slipping backwardly in the shell and making its exit through one of the rear recesses $a'$.

In Fig. 3, I have shown a slightly modified form of construction which consists in forming the base or bottom A' of the bait holder of wire gauze, instead of a sheet of aluminum or other material. The sides D'' are bent upwardly as described with reference to Fig. 1. The operation of the device will be the same as that heretofore described.

I claim:—

1. In a bait holder, a housing formed of a dish shaped base having openings through the sides thereof, a cover comprising a wire bent to form a retaining cover, part of which is movable to provide a door for the bait, means for locking said door in closed position, and means for detachably securing hooks to different parts of said holder.

2. In a bait holder, a housing formed of a dish shaped base member having notches or openings through the sides thereof, a wire covering for said base, said wire being bent to form spring members having loops therein for engaging hooks outside the base.

3. In a bait holder, a housing formed of a dish shaped base member having recesses formed therein, a wire covering extending over the top of said shell, a part of which is movably attached thereto, and a lining member adapted to be removably inserted in said shell.

In testimony whereof I have signed this specification.

GUNNAR LARSON.